(12) United States Patent
Aaron

(10) Patent No.: US 8,104,368 B2
(45) Date of Patent: Jan. 31, 2012

(54) LOAD BEARING SPROCKET SYSTEM

(76) Inventor: Charles Wayne Aaron, Hutto, TX (US)

( * ) Notice: Subject to any disclaimer, the term of this patent is extended or adjusted under 35 U.S.C. 154(b) by 0 days.

(21) Appl. No.: 11/345,799

(22) Filed: Feb. 2, 2006

(65) Prior Publication Data

US 2007/0186706 A1 Aug. 16, 2007

(51) Int. Cl.
F16H 1/04 (2006.01)
F16H 29/00 (2006.01)

(52) U.S. Cl. ......................... 74/422; 74/89.18

(58) Field of Classification Search .................. 74/422, 74/89.17, 89.18, 460, 30, 457, 29, 437; 414/522, 414/537
See application file for complete search history.

(56) References Cited

U.S. PATENT DOCUMENTS

| | | | | |
|---|---|---|---|---|
| 1,529,642 A * | 3/1925 | Callahan | .......................... | 74/422 |
| 2,346,424 A * | 4/1944 | Griffith | ........................... | 74/422 |
| 2,688,881 A * | 9/1954 | Crossland | .................... | 74/412 R |
| 3,214,809 A * | 11/1965 | Edwards | ...................... | 24/68 B |
| 3,399,578 A * | 9/1968 | Lindabury, Sr. et al. | ...... | 74/89.21 |
| 3,824,871 A * | 7/1974 | Loesch et al. | .................... | 74/422 |
| 4,209,278 A * | 6/1980 | Cooper et al. | ................. | 414/477 |
| 4,320,934 A * | 3/1982 | Rock et al. | ...................... | 312/331 |
| 4,470,746 A | 9/1984 | Delachapelle | ................ | 414/470 |
| 4,753,119 A * | 6/1988 | Kuspert | ......................... | 74/89.21 |
| 4,998,442 A * | 3/1991 | Brown et al. | ................. | 74/89.17 |
| 5,209,057 A * | 5/1993 | Remlaoui | ..................... | 60/226.2 |
| 5,224,391 A * | 7/1993 | Schlechta | ..................... | 74/89.18 |
| 5,884,527 A * | 3/1999 | Cole et al. | ........................ | 74/434 |
| 5,902,001 A * | 5/1999 | Schneider | ................... | 296/26.13 |
| 6,023,989 A * | 2/2000 | Imase et al. | ...................... | 74/422 |
| 6,062,614 A * | 5/2000 | Petzold | ........................ | 292/336.3 |
| 6,314,680 B1 * | 11/2001 | Buckwalter et al. | ........... | 49/82.1 |
| 6,343,522 B1 * | 2/2002 | Hori et al. | ......................... | 74/422 |
| 6,379,100 B2 | 4/2002 | Schultz | ............................ | 414/499 |
| 6,427,552 B1 * | 8/2002 | Sahr | ............................. | 74/422 |
| 6,533,107 B2 * | 3/2003 | Suzuki et al. | .................. | 198/834 |
| 6,799,790 B2 * | 10/2004 | Sakai et al. | ................. | 296/146.8 |
| 6,910,397 B2 * | 6/2005 | Schapiro et al. | .............. | 74/89.18 |
| 7,048,666 B2 * | 5/2006 | Nagata | ............................ | 474/212 |
| 7,051,344 B2 * | 5/2006 | Mizuno | .......................... | 720/601 |
| 2003/0209100 A1 * | 11/2003 | Tsubouchi et al. | .............. | 74/422 |
| 2004/0035235 A1 * | 2/2004 | Sasaki et al. | ...................... | 74/422 |
| 2004/0144189 A1 * | 7/2004 | Nakamura et al. | ............ | 74/89.18 |
| 2004/0221667 A1 * | 11/2004 | Schapiro et al. | ............. | 74/89.18 |
| 2007/0176453 A1 * | 8/2007 | Aaron | ............................. | 296/61 |

FOREIGN PATENT DOCUMENTS

GB 2 199 633 A * 7/1988

* cited by examiner

Primary Examiner — Richard W Ridley
Assistant Examiner — Matthew R Vaerewyck
(74) Attorney, Agent, or Firm — Parsons Behle & Latimer

(57) ABSTRACT

A system for laterally transporting a load. The system uses a sprocket and an integrally formed rack combination. The crowns of the teeth of the rack are rounded so as to engage the lower most troughs of the space between the teeth of the sprocket so that a vertical load may be placed on the system and yet allow lateral translating of the load as the sprocket is rotated.

20 Claims, 4 Drawing Sheets

LOAD BEARING SPROCKET SYSTEM

TECHNICAL FIELD OF THE INVENTION

This invention relates generally to a load bearing sprocket and rack system. The profile of the rack resembles the profile of a typical roller chain. The rack is actuated using a load-bearing sprocket that meshes with the profile of the rack. Due to the design of the sprocket and rack system the sprocket is able to support a heavy normal load while providing linear motion.

BACKGROUND AND OBJECTS OF THE INVENTION

The present invention relates to rack and pinion systems. Rack and pinion systems have been well known to move the rack along a linear path due to the rotation of the pinion meshed with the rack. The typical rack and pinion system usually consists of a spur gear pinion and a straight gear rack. The rotation of the pinion causes the rack to move in a straight path. The disadvantage with a conventional rack and pinion system is that the pinion is typically not designed to support a substantial normal load perpendicular to the rack. If a substantial normal load were applied perpendicular to the rack, the teeth of the pinion and rack would typically wedge together causing the teeth to break once a rotational torque was applied to the pinion. Thus, only a directional load, or in other words a load substantially parallel to the rack in the direction of travel of the rack, could be applied. To overcome this shortcoming, conventional rack and pinion systems generally use a set of rollers or guides to support a substantial normal load applied perpendicular to rack.

The present invention is directed to overcoming, or at least reducing the effects of, one or more of the issues set forth above.

SUMMARY OF THE INVENTION

In a preferred embodiment of the invention, the bottom surface of a rack may include teeth that mesh with a sprocket wherein the rotation of the sprocket extends or retracts the rack. Preferably the design of the rack and sprocket allows the sprocket to support a substantial load perpendicular to the rack while still providing linear movement to the rack. In such an embodiment, the bottom profile of the rack may mimic rollers of a typical roller chain.

In one embodiment, the rack may be straight; the rack may extend in a linear motion, by the rotation of a sprocket that engages the bottom of the straight rack. In an alternative embodiment, the rack may be curved to allow for the rack to have motion along a curved path.

One embodiment of the invention is a rack and sprocket system wherein the sprocket includes teeth having the lower most surfaces between the teeth being substantially rounded and the rack includes teeth having a profile substantially similar to the profile of a roller chain.

These and other objects and advantages of the present invention will be made apparent from the following detailed description, with reference to the accompanying drawings. In the drawings, the same reference numbers are used to denote similar components in the various embodiments.

BRIEF DESCRIPTION OF THE DRAWING

The following figures form part of the present specification and are included to further demonstrate certain aspects of the present invention. The invention may be better understood by reference to one or more of these figures in combination with the detailed description of specific embodiments presented herein.

Figure 1:
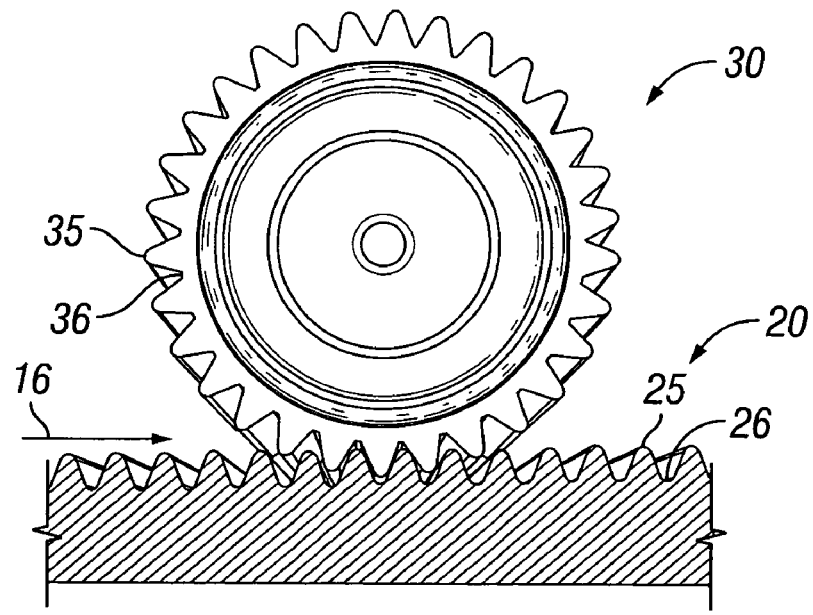
FIG. 1 depicts the prior art of a typical rack and pinion system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DESCRIPTION OF ILLUSTRATIVE EMBODIMENTS

Illustrative embodiments of the invention are described below as they might be employed in the use of designs for load bearing sprocket and rack. In the interest of clarity, not all features of an actual implementation are described in this specification. As used herein, sprocket may be utilized interchangeably with pinion and each term is to be given its ordinary meaning. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Further aspects and advantages of the various embodiments of the invention will become apparent from consideration of the following description and drawings.

Figure 2:
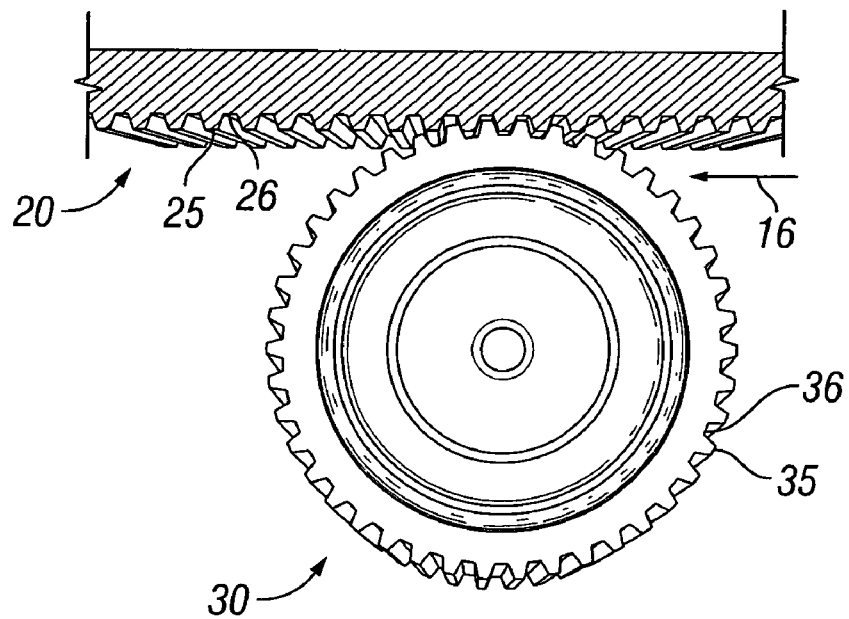
FIG. 2 is a cross-section of the prior art of a typical rack and pinion system.

The design of the teeth of the prior art rack and pinion systems, as shown in FIGS. 1 and 2, are such that the systems are typically limited to only applying a directional load to the pinion or rack. The teeth 25 of the rack 20 and the teeth 35 of the pinion 30 are both substantially straight and designed to provide movement to the rack 20 when a direction load 16 is applied. The troughs 26 of the rack and the troughs 36 of the pinion are typically designed to mate with corresponding teeth, but are not designed to "bottom out" or allow the teeth to contact the trough. The troughs 26, 36 do not provide substantial support for a load perpendicular to the rack 20. Thus, if a vertical load (not pictured) were applied to the prior art, the teeth 25, 35 would wedge together and likely break once a sufficient horizontal directional load 16 was applied by the rotation of the pinion 30.

Figure 3:
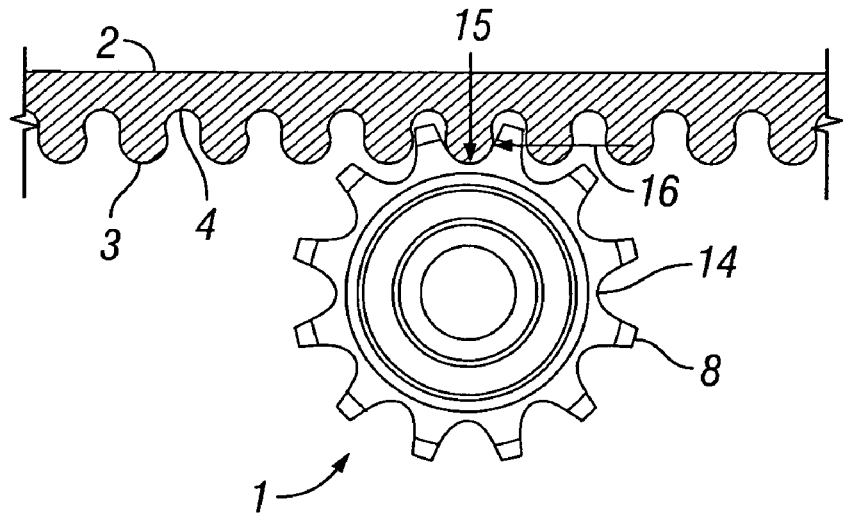
FIG. 3 is a cross-section to a rack and sprocket of the present disclosure wherein pinion 1 meshes with the teeth 3 of a rack 2 formed in the bottom surface of the rack 2 and the teeth 3 of the rack 2 resemble the profile of a roller chain.

FIG. 3 is the cross-section of a rack 2 and sprocket 1 system of the present disclosure. The teeth 3 of the rack 2 are designed to resemble the profile of a roller chain (see FIG. 5). As such, the teeth 3 are rounded as well as each trough 4 between the teeth 3. The sprocket 1 is designed to accommodate the rounded teeth 3 of the rack 2 and as such provides more clearance between the teeth 8 of the sprocket allowing the teeth 3 of the rack to contact the troughs 14. The troughs 14 of the sprocket 1 are shaped to correspond to the crowns of the teeth 3 of the rack 2. The curvature of the teeth 3 of the rack 2 in combination with the improved openings 14 of the sprocket 1 allows the sprocket 1 to support the rack 2 when a normal or vertical load 15 is applied to the rack 2. Further, this design also provides that the teeth 3 will not bind with the sprocket 1 when a directional or horizontal load 16 is applied to the sprocket 1, but will roll out of the valley due to the rotation of the sprocket 1. This metal on metal mating of the rack 2 and sprocket 1 will require lubrication of the contacting surfaces to reduce wear and friction. In this way the sprocket 1 is able to rotate and directionally move the rack 2 while still providing support for a substantial normal load 15 on the rack 2.

In the preferred embodiment of the disclosure, the rack 2 is designed such that the centers of two adjacent teeth 3 as well as the centers of two adjacent troughs 4 are 2½ inches apart. Thus, the horizontal distance from the center of a tooth 3 to the center of an adjacent trough 4 is 1¼ inches. The center of each tooth 3 is offset above the centers of the adjacent troughs 4 by ⅜ inches. The radius of curvature of each trough 4 is 9/16 inches whereas the radius of curvature of the end of each rounded tooth 3 is ¾ inches.

In the preferred embodiment of the disclosure, the sprocket 1 is a 4 13/16 inch sprocket. The end of each tooth 8 of the sprocket 1 may include a flat surface ⅝ inches in length. The horizontal distance between the centers of adjacent troughs 14 is 2 ½ inches responding to the length between the centers of adjacent teeth 3 of the rack 2. The radius of curvature of each trough 14 is 25/32 inches. However, various other dimensions for both of the rack 2 and sprocket 1 may be utilized for providing a loading bearing sprocket and rack system as would be realized by one of ordinary skill in the art having the benefit of this disclosure.

Figure 4A:
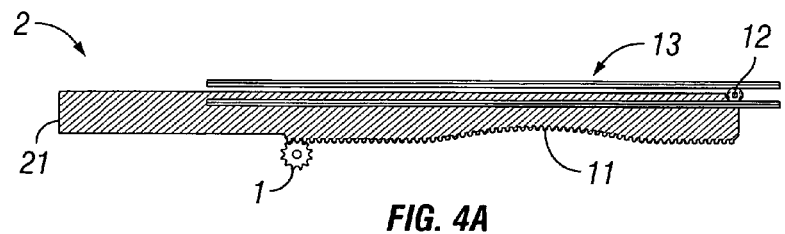
FIGS. 4A-4D depicts the various motions of a rack 2 and sprocket 1 of the present disclosure.
Figure 4B:
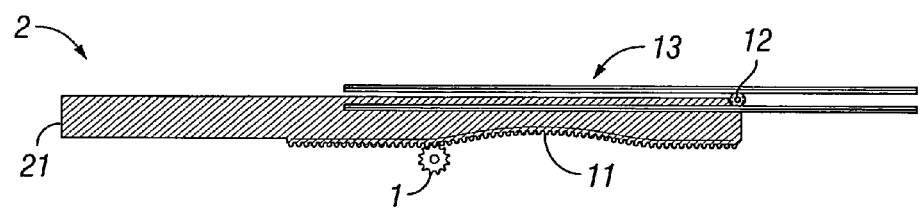
Figure 4C:
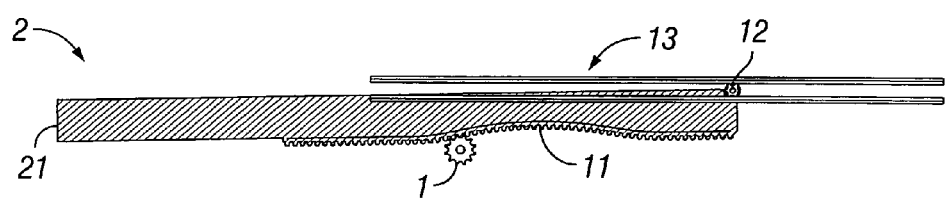
Figure 4D:
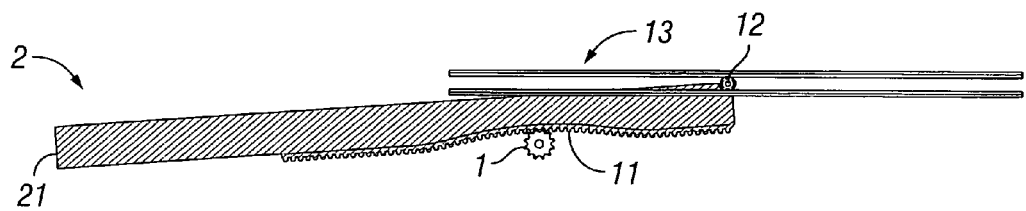

FIGS. 4A-4D depict the motion of a rack 2 and sprocket 1 as the rack 2 is extended. FIG. 4A shows the rack 2 in a substantially retracted position. The rack 2 may include a pin or roller 12 and a guide 13. As the rack 2 is extended or retracted the pin 12 may travel along the guide 13 keeping the end 19 of the rack 2 properly aligned as the other end 21 extends out. As depicted in FIGS. 4A-4C the end 21 of rack 2 may extend horizontally as it begins to move. In one embodiment, the rack 2 may include a curved portion 11 that causes the end 21 of rack 2 to descend downwards when the sprocket 1 has rotated such that it is located at the curved portion 11 of rack 2. As depicted in FIG. 4D, the end 21 of the rack 2 extends down as the sprocket 1 rotates through the curved portion 11 of the rack 2.

Figure 5:
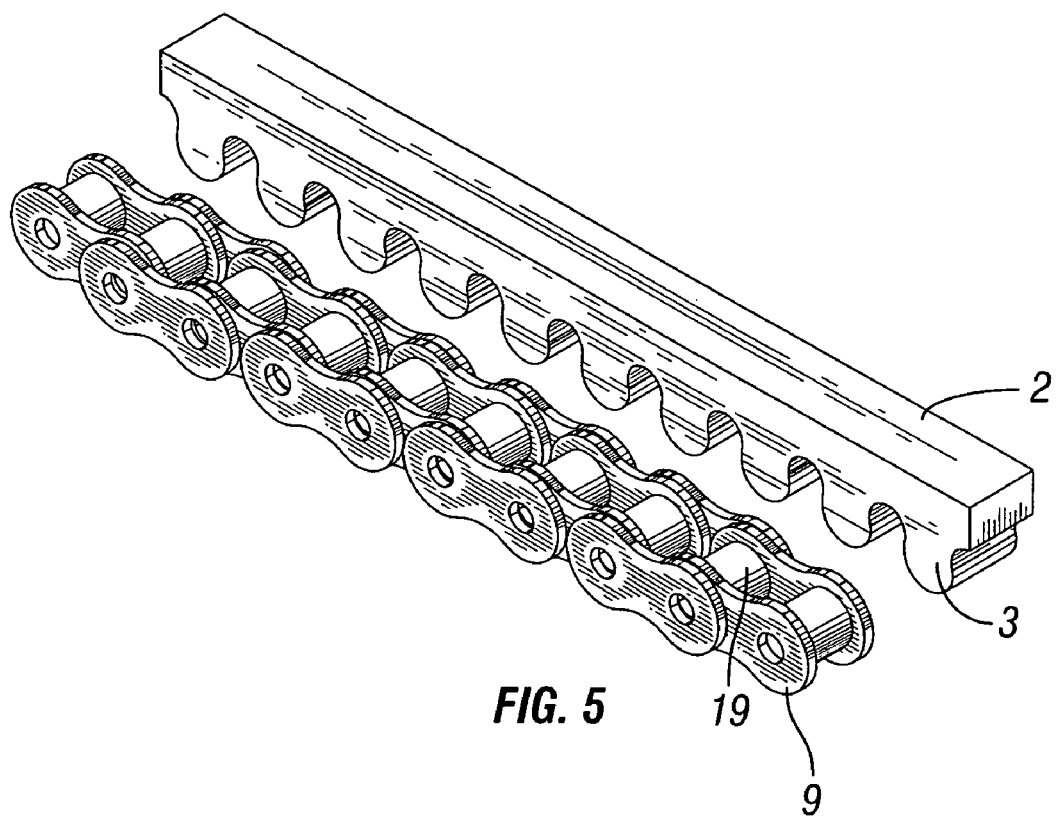
FIG. 5 illustrates that the teeth 3 of a rack 2 of the present disclosure resembles the profile of a roller chain 9.
Figure 6:
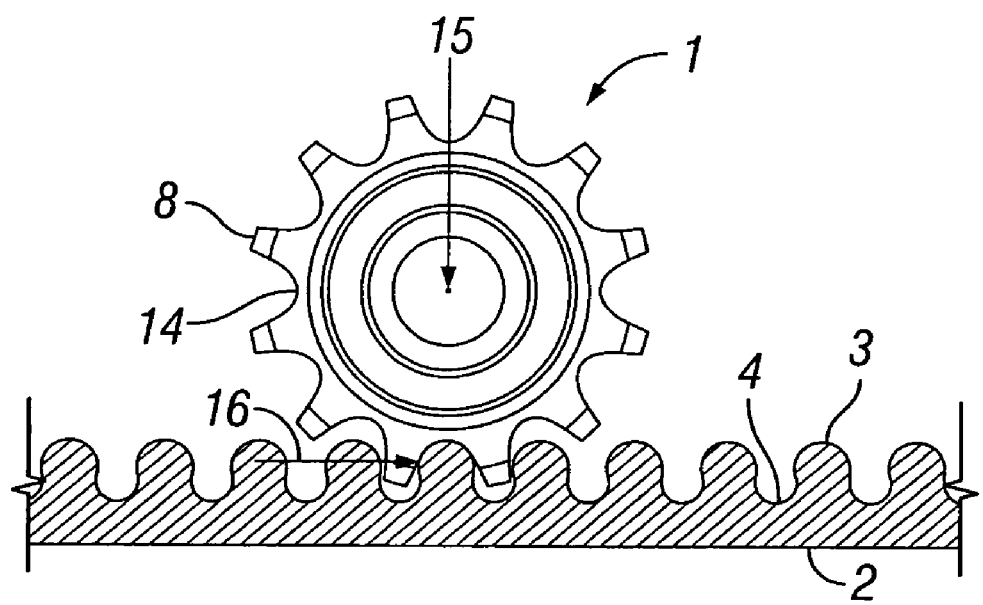
FIG. 6 is a cross-section similar to FIG. 3 but showing the load 15 being applied to pinion 1 with the teeth 3 of the rack 2 formed in the top surface of the rack 2.

FIG. 5 illustrates the bottom of a rack 2 that substantially mimics the profile of a roller chain 9. The teeth 3 of the rack 2 correspond to the rollers 19 of the roller chain 9. The design of the rack allows the teeth 3 of the rack 2 that contact a sprocket (not pictured in FIG. 5) to rotate out of a corresponding trough of the sprocket, thus moving the rack 2. A substantial normal load 15 may be applied to the rack 2 as in FIG. 3 or sprocket 1 as in FIG. 6 as the rack 2 and sprocket 1 will not bind during the rotation of the sprocket 1 due to the roller chain designed teeth 3. The design of the rack and sprocket may require lubrication applied between the mating surfaces of the rack and sprocket to function properly due to significant contact area between the rack and sprocket. It is the described design of the contact area and relationship that allows the sprocket to support a normal load 15 while still able to apply a directional (FIG. 3) or rotational (FIG. 6) load to the rack 2.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A load bearing rack and sprocket system for laterally transporting a load, the system comprising:
 a sprocket having spaced teeth, wherein each space between the teeth having a first lower most trough that is substantially rounded; and
 an integrally formed rack associated with the sprocket and adapted for bearing the load, the rack having a top surface, a bottom surface and a plurality of spaced teeth formed in the bottom surface, each tooth having a crown substantially rounded so as to correspond to the first lower most troughs and each space between the teeth having a second lower most trough that is substantially rounded, wherein the teeth of the sprocket mesh with the teeth of the rack such that the crowns of the teeth of the rack are completely seated in a center of the first lower most troughs of the sprocket while the teeth of the sprocket do not contact the second lower most troughs of the rack, whereby the system is configured to support a normal load while the sprocket is rotated so as to move the load laterally; and
 wherein the bottom surface of the rack includes a substantially arcuate section of spaced teeth that is arcuate in the direction of the longitudinal axis of the rack, the longitudinal axis being parallel with the direction of lateral movement.

2. The rack and sprocket system of claim 1, wherein the tooth to tooth pitch length of the rack is substantially equal to the trough to trough pitch length of the sprocket.

3. The rack and sprocket system of claim 1, wherein each rounded first lower most trough has a radius of curvature greater than the radius of curvature of the crown of each tooth of the rack.

4. The rack and sprocket system of claim 1, wherein an end of each tooth of the sprocket comprises a flat surface.

5. The rack and sprocket system of claim 1, wherein the normal load is applied to the rack.

6. The rack and sprocket system of claim 1, wherein the normal load is applied to the sprocket.

7. The rack and sprocket system of claim 1, wherein the normal load is fully supported at a point where the crowns of the rack and the first lower most troughs of the sprocket contact each other.

8. The rack and sprocket system of claim 1, wherein a horizontal distance between centers of the second lower most troughs is 2.5 inches, and a horizontal distance between a center of the crown and the center of the second lower most trough is 1.25 inches, the center of each crown being offset above the centers of the lower most troughs by 0.375 inches.

9. The rack and sprocket system of claim 1, wherein a radius of curvature of the second lower most troughs is 9/16 of an inch, and a radius of curvature of the crown is ¾ of an inch.

10. A load bearing rack and sprocket system for laterally transporting a load, the system comprising:
   a sprocket adapted for bearing the load, the sprocket having spaced teeth, wherein each space between the teeth having a first lower most trough that is substantially rounded; and
   an integrally formed rack associated with the sprocket, the rack having a bottom surface, a top surface and a plurality of spaced teeth formed in the top surface, each tooth having a crown substantially rounded so as to correspond to the first lower most troughs and each space between the teeth having a second lower most trough that is substantially rounded, wherein the teeth of the sprocket mesh with the teeth of the rack such that the crowns of the teeth of the rack are completely seated in a center of the first lower most troughs of the sprocket while the teeth of the sprocket do not contact the second lower most troughs of the rack, whereby the system supports a normal load while the sprocket is rotated so as to move the load laterally; and
   wherein the top surface of the rack includes a substantially arcuate section of spaced teeth that is arcuate in the direction of the longitudinal axis of the rack, the longitudinal axis being parallel with the direction of lateral movement.

11. The rack and sprocket system of claim 10, wherein the tooth to tooth pitch length of the rack is substantially equal to the trough to trough pitch length of the sprocket.

12. The rack and sprocket system of claim 10, wherein each rounded first lower most trough has a radius of curvature greater than the radius of curvature of the crown of each tooth of the rack.

13. The rack and sprocket system of claim 10, wherein an end of each tooth of the sprocket comprises a flat surface.

14. The rack and sprocket system of claim 10, wherein the normal load is applied to the rack.

15. The rack and sprocket system of claim 10, wherein the normal load is applied to the sprocket.

16. The rack and sprocket system of claim 10, wherein the normal load is fully supported at a point where the crowns of the rack and the first lower most troughs of the sprocket contact each other.

17. A method for laterally transporting a normal load with a rack and sprocket system, the method comprising:
   placing a normal load on a rack and sprocket system; and
   inducing lateral motion of the load, the lateral motion being substantially perpendicular to the normal load, wherein the racket and sprocket system comprises
      a sprocket with spaced teeth, wherein each space between the teeth has a first lower most trough that is substantially rounded;
      an integrally formed rack associated with the sprocket, the rack having at least one surface and a plurality of spaced teeth formed in the surface, each tooth having a crown substantially rounded so as to correspond to the first lower most troughs and each space between the teeth having a second lower most trough that is substantially rounded, wherein the teeth of the sprocket mesh with the teeth of the rack such that the crowns of the teeth of the rack are completely seated in a center of the first lower most troughs of the sprocket while the teeth of the sprocket do not contact the second lower most troughs of the rack;
      the rack surface including a substantially arcuate section of spaced teeth that is arcuate in a direction of a longitudinal axis of the rack such that sprocket rotation adds a vertical motion component to the rack's lateral movement.

18. The method of claim 17, wherein inducing lateral motion of the load comprises rotating the sprocket.

19. The method of claim 17, further comprising guiding an end of the rack along a guide.

20. The method of claim 19, further comprising engaging the guide with a pin or roller connected to the end of the rack.

* * * * *